United States Patent
Worden et al.

(10) Patent No.: US 12,092,246 B2
(45) Date of Patent: Sep. 17, 2024

(54) SCALABLE CABLE HANGER

(71) Applicant: Gamechange Solar Corp., Norwalk, CT (US)

(72) Inventors: Andrew Barron Worden, Redding, CT (US); Woo Kim, Little Neck, NY (US)

(73) Assignee: Gamechange Solar Corp., Norwalk, CT (US)

( * ) Notice: Subject to any disclaimer, the term of this patent is extended or adjusted under 35 U.S.C. 154(b) by 0 days.

(21) Appl. No.: 17/968,671

(22) Filed: Oct. 18, 2022

(65) Prior Publication Data
US 2023/0167922 A1    Jun. 1, 2023

Related U.S. Application Data

(60) Provisional application No. 63/273,371, filed on Oct. 29, 2021.

(51) Int. Cl.
| | |
|---|---|
| *F16L 3/22* | (2006.01) |
| *F16L 3/02* | (2006.01) |
| *F16L 3/12* | (2006.01) |
| *F16L 3/137* | (2006.01) |

(52) U.S. Cl.
CPC ............... *F16L 3/221* (2013.01); *F16L 3/02* (2013.01); *F16L 3/1218* (2013.01); *F16L 3/137* (2013.01)

(58) Field of Classification Search
CPC . F16L 3/221; F16L 3/02; F16L 3/1218; F16L 3/137; F16L 3/222; F16L 3/2235; F16L 3/227; F16L 3/11; F16L 3/14; H02G 3/32
USPC .................................................. 248/58, 73
See application file for complete search history.

(56) References Cited

U.S. PATENT DOCUMENTS

| | | | | |
|---|---|---|---|---|
| 1,815,750 | A * | 7/1931 | Watts ...................... | F23M 5/06 248/58 |
| 4,306,697 | A * | 12/1981 | Mathews ................ | F16L 3/222 248/68.1 |
| 6,508,441 | B1 * | 1/2003 | Kirschner ............... | F16L 3/243 248/62 |
| 2003/0025059 | A1 * | 2/2003 | Valentz .................... | F16L 3/00 248/346.01 |
| 2008/0296443 | A1 * | 12/2008 | Lunitz ..................... | H02G 3/32 248/65 |
| 2009/0293233 | A1 * | 12/2009 | Ho .......................... | F16L 3/223 24/571 |
| 2012/0267483 | A1 * | 10/2012 | Colvin ................... | H02G 3/263 248/62 |
| 2015/0204549 | A1 * | 7/2015 | Jacobs .................... | F16L 3/237 248/68.1 |
| 2018/0266588 | A1 * | 9/2018 | Netke ..................... | F16L 55/02 |

* cited by examiner

*Primary Examiner* — Christopher Garft
(74) *Attorney, Agent, or Firm* — O'Shea P.C.

(57) ABSTRACT

A cable hanger assembly comprises a unitary skeletal frame comprising (i) a base that comprises a first base surface and a second base surface that are separated by a channel that is open at a proximate channel end and closed at a distal channel end, (ii) a first sidewall extending from a distal end of the first base surface to the distal channel end, (iii) a second sidewall extending from a distal end of the second base surface to the distal channel end, and (iv) where at least one of the first and second base surfaces includes a slot open on its respective proximate slot end. A removable and replaceable strap or supplemental hanger assembly may be engaged with the slot and hangs from the slot.

18 Claims, 9 Drawing Sheets

SCALABLE CABLE HANGER

CROSS REFERENCE TO RELATED APPLICATIONS

This application claims the benefit of U.S. Provisional Patent Application Ser. No. 63/273,371 filed Oct. 29, 2021, which is hereby incorporated by reference.

BACKGROUND OF THE INVENTION

1. Technical Field

This disclosure relates generally to cable hangers, and in particular to a scalable cable hanger assembly for use with solar panel mounting systems.

2. Background Information

Cable hangers are known for suspending cables (e.g., power and data) from a messenger wire or other support in a utility scale solar power plant. As utility scale solar power plants have increased in scope there is a greater need to handle the increased number of cables that are suspended from the racking or tracker systems. In addition, since each utility scale solar power plant is different, the hanger needs are different. There is a need for an improved cable hanger that is scalable.

SUMMARY OF THE DISCLOSURE

According to an aspect of the disclosure, a cable hanger assembly comprises a unitary skeletal frame comprising a base that comprises a first base surface and a second base surface that are separated by a channel that is open at a proximate channel end and closed at a distal channel end, a first sidewall extending from a distal end of the first base surface to the distal channel end, a second sidewall extending from a distal end of the second base surface to the distal channel end, and where at least one of the first and second base surfaces includes a slot open on its respective proximate slot end.

The first sidewall may include a finger projection extending in the direction of the distal channel end, where the finger projection includes a finger distal end that is separated from the first sidewall and forms a cable receptacle area with the first sidewall.

The second sidewall may include a second finger projection extending in the direction of the distal channel end, where the second finger projection includes a second finger distal end that is separated from the second sidewall and forms a second cable receptacle area with the second sidewall.

At least one of the first and second sidewalls may include an outwardly facing furcated member.

The unitary skeletal frame may comprise polypropylene.

The unitary skeletal frame may comprise polypropylene with an ultraviolet additive.

The unitary skeletal frame may comprise plastic.

The unitary skeletal frame may comprise metal.

The slot may be a T-slot.

The slot may be a dovetail slot.

The cable hanger assembly may further comprise a unitary supplemental hanger assembly that comprises a shaft, a slot nut located at a distal shaft end of the shaft, and a plurality of cable holding projections extending from the shaft.

The cable holding projections may include a J-hook.

The cable holding projections may include a plurality of J-hooks in spaced relationship.

The unitary skeletal frame may further comprise a second slot located in one of the first or second base surfaces; and a strap having a first longitudinal end and a second longitudinal end, where the first longitudinal end includes a first slot nut that engages with the first slot and the second longitudinal end includes a second slot nut that engages with the second slot, such that the strap forms a cable carrying receptacle suspended from the unitary skeletal frame.

The strap may be polypropylene.

The strap may comprise polypropylene with an ultraviolet additive.

The strap may be plastic.

The strap may be metal.

The hanger may be configured and arranged as a truss structure comprising a plurality of webs.

The cable hanger assembly may include a removable and replaceable supplemental hanger assembly that is engaged with the slot and suspended from the slot.

The foregoing features and the operation of the invention will become more apparent in light of the following description and the accompanying drawings.

DETAILED DESCRIPTION

Figure 1:
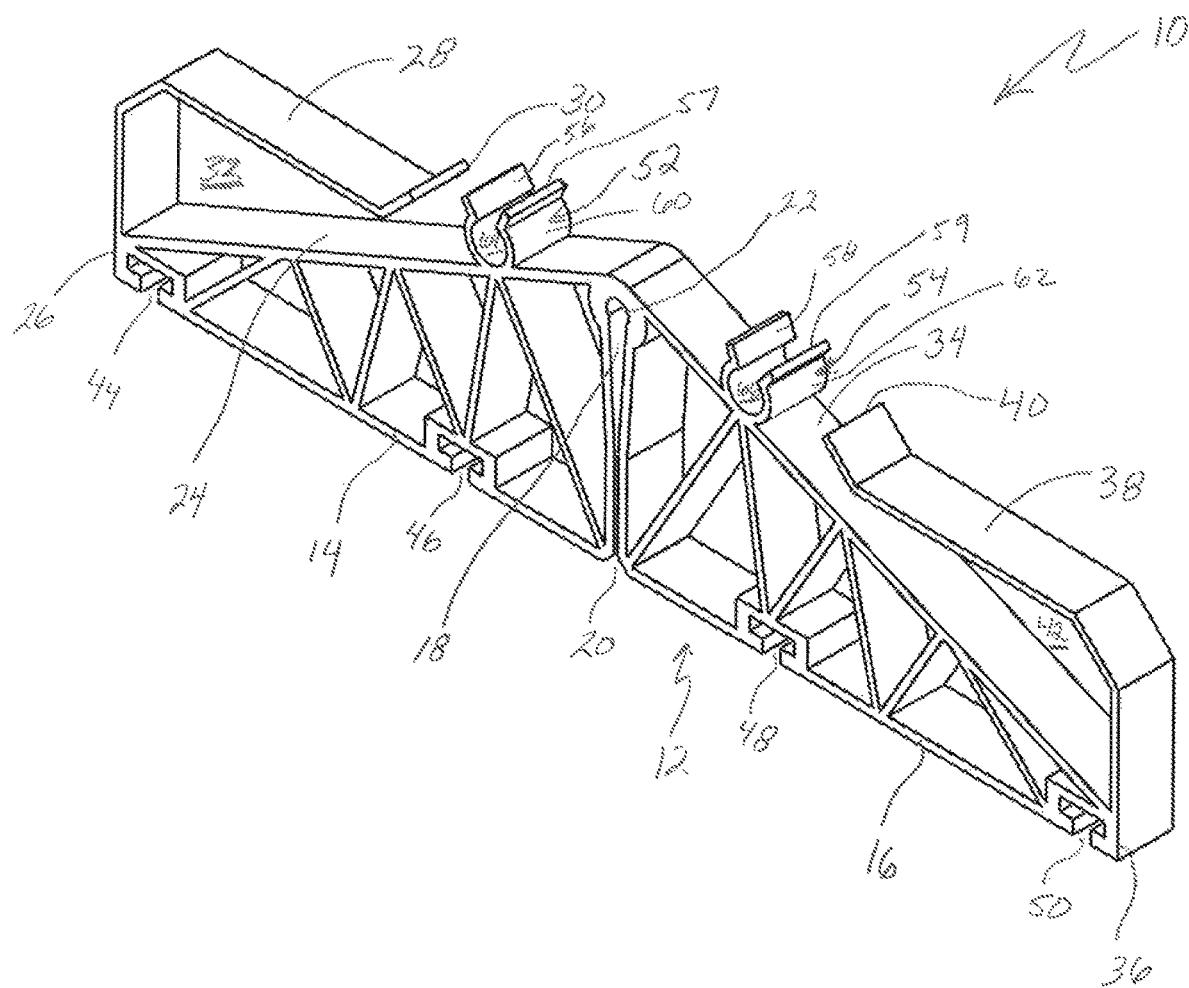
FIG. 1 illustrates a perspective view of a skeletal frame of a cable hanger assembly.
Figure 2:
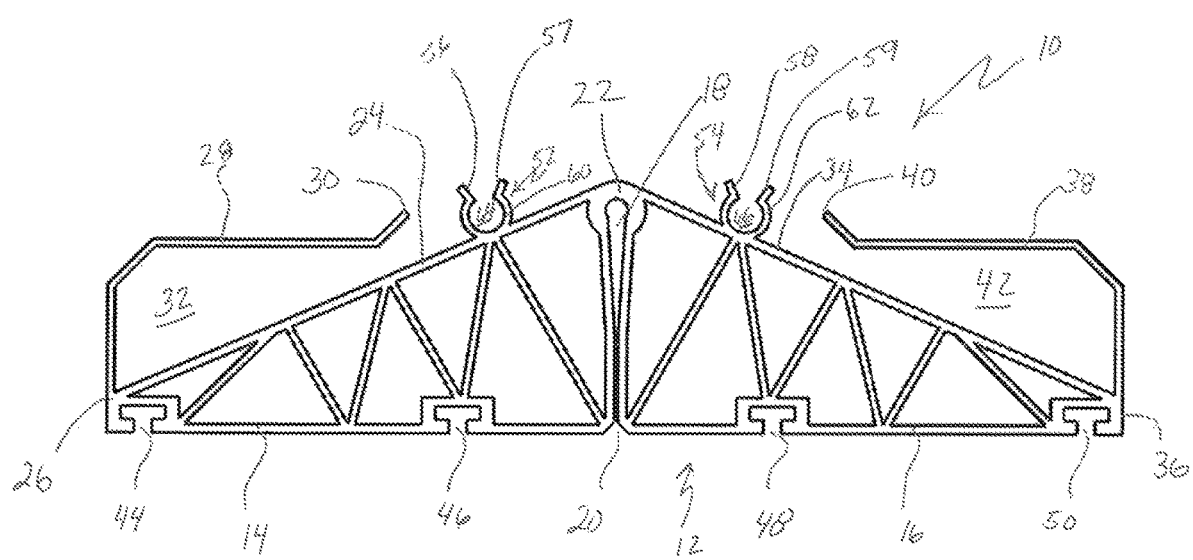
FIG. 2 illustrates a front view of the skeletal frame illustrated in FIG. 1.

FIG. 1 illustrates a perspective view of a skeletal frame 10 of a cable hanger assembly. FIG. 2 illustrates a front view of the skeletal frame 10 illustrated in FIG. 1. Referring to FIGS. 1 and 2, the skeletal frame 10 includes a base 12 that comprises a first base surface 14 and a second base surface 16, which are separated by a channel 18 open at a proximate channel end 20 and closed at a distal channel end 22. The frame 10 also includes a first sidewall 24 extending from a distal end 26 of the first base surface 14 to the distal channel end 22. The first sidewall 24 includes a first finger projection 28 extending in the direction of the distal channel end 22, where the finger projection 28 includes a finger distal end 30 that is separated from the first sidewall 24 to form a cable receptacle area 32 in cooperation with the first sidewall. In this embodiment the first finger projection 28 is L- or J-shaped, but it is contemplated that the finger projection may take on various shapes to form a suitable cable receptacle area with the first sidewall. The frame may be configured as a truss with the plurality of webs supporting the first and second bases 14, 16 and the first and second sidewalls 24, 34.

The frame 10 also includes a second sidewall 34 extending from a distal end 36 of the second base surface 16 to the distal channel end 22. The second sidewall 34 includes a second finger projection 38 extending in the direction of the distal channel end 22. The second finger projection 38 includes a finger distal end 40 that is separated from the second sidewall 34 to form a second cable receptacle area 42 in cooperation with the second sidewall 34. In this embodiment, the second finger projection 38 may also be L- or J-shaped, but again it is contemplated that the finger projection may take on various shapes to form the cable receptable area 42.

At least one of the first and second base surfaces 14, 16 includes a slot open on its respective proximate slot end 20. In this embodiment, the first base surface 14 includes slots 44, 46, and the second base surface 16 14 includes slots 48, 50. Each of these slots is open on its respective proximate slot end 20 side. The slots may be configured in various shapes. For example, one or more of the slots may be configured as a T-slot, a dovetail slot, et cetera. In addition, the hanger may have no slots, one slot or a plurality of slots.

The frame 10 may be constructed of a number of different materials depending upon a number of factors, including the operating environment and load requirements on the hanger. In one embodiment, the skeletal frame 10 may be a unitary structure that comprises polypropylene, polypropylene with an ultraviolet additive or other types of plastic. The frame may also comprise metal, e.g., shape retention wire. While an exemplary embodiment of the frame is a unitary structure, one skilled in the art will recognize that the frame may be a non-unitary structure.

Referring still to FIG. 1, at least one of the first and second sidewalls 24, 34 includes an outwardly facing furcated member, such as for example outwardly facing furcated members 52, 54. In this exemplary embodiment the furcated members 52, 54 included opposing sloped sidewalls 56-59 and receptacle frames 60, 62 that form cable receptacle areas 64, 66. The receptacle frames 60, 62 may be shaped as a partial sphere, oblate spheroid, U-shaped, W-shaped, J-shaped, et cetera, such that the cable receptacle areas 64, 66 can hold a conductive cable or a data cable wire. In the exemplary embodiment of FIG. 1, the area/volume formed by the receptacle frames 60, 62 is large enough to accept a cable that will pass through the cable receptacle areas 64, 66 and the sloped sidewalls 56-59 facilitate insertion of the cable in the cable receptacle areas 64, 66. The opposing sloped sidewalls 56-59 and receptacle frames 60, 62 may have sufficient flexibility so the base of the sidewalls move outwardly when the force of a cable being inserted acts on the sidewalls and then return to their nominal position such that the cable may not be removed from the receptacle without the sidewalls 56-59 flexing outwardly.

The frame 10 may be hung from a messenger wire (not shown) that runs through the channel 18 to support the frame at the distal channel end 22. Once the frame is hung from the messenger wire, conductive and/or data cables may be inserted for support by the hanger. For example, power cables may be inserted into the first and second cable receptacle areas 32, 42 and data cables may be inserted into the cable receptacle areas 64, 66.

Figure 3:
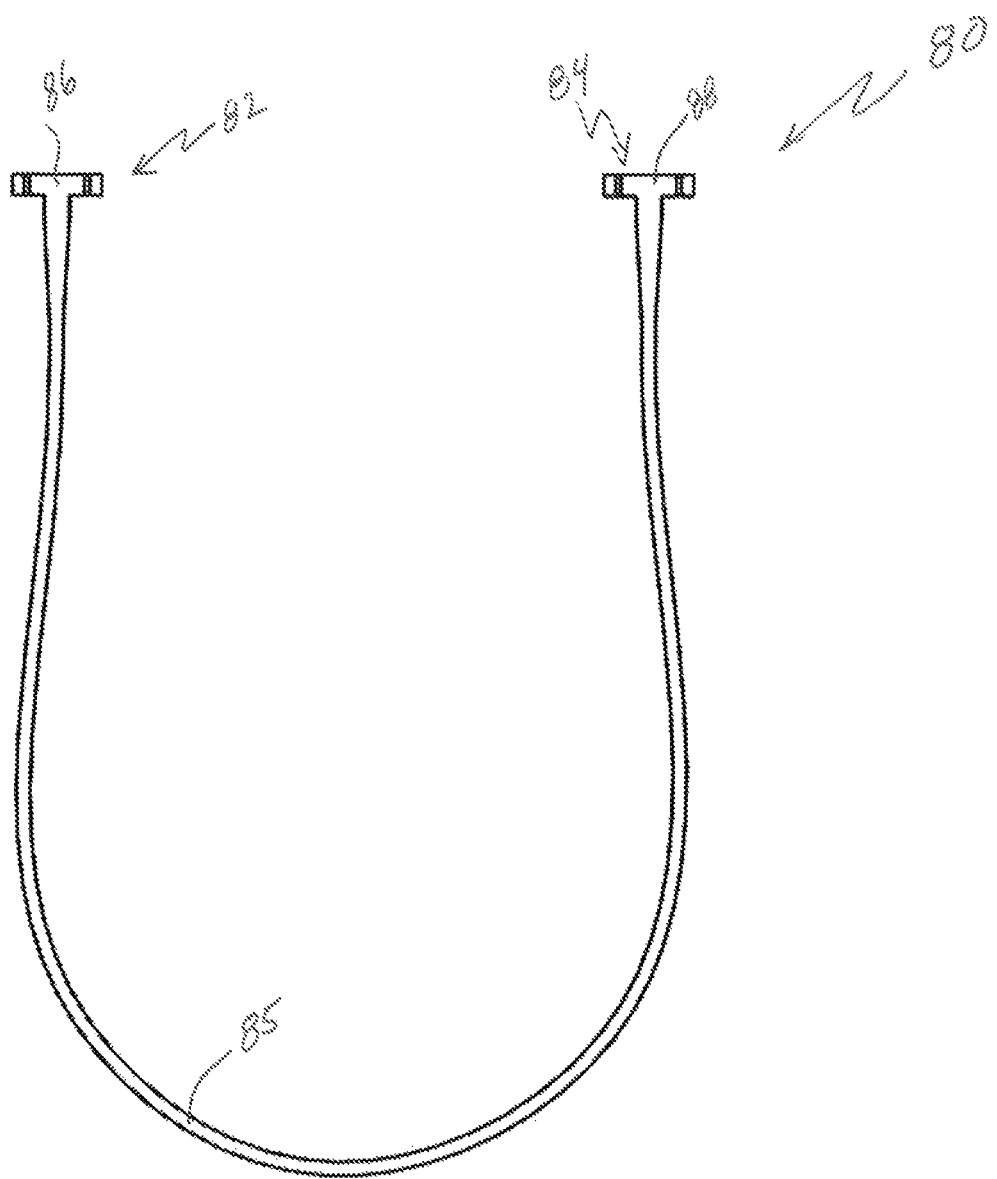
FIG. 3 is a front view of a strap that may be engaged to the skeletal frame of FIGS. 1 and 2.

FIG. 3 is a front view of a strap 80 that may be engaged to the skeletal frame 10 of FIGS. 1 and 2. The strap 80 includes a first longitudinal end 82 and a second longitudinal end 84 and a strap support surface 85 extending there between. The first longitudinal end 82 includes a first slot nut 86 that engages with a first slot of the frame 10 (FIGS. 1 and 2) and the second longitudinal end 84 includes a second slot nut 88 that engages with a second slot of the frame, such that the strap forms a cable carrying receptacle when suspended from the unitary skeletal frame. The strap may be formed from the same material as the frame or from a dissimilar material. In one embodiment, the strap 80 is substantially U-shaped as shown in FIG. 3 and formed from polypropylene with a UV additive.

Figure 4:
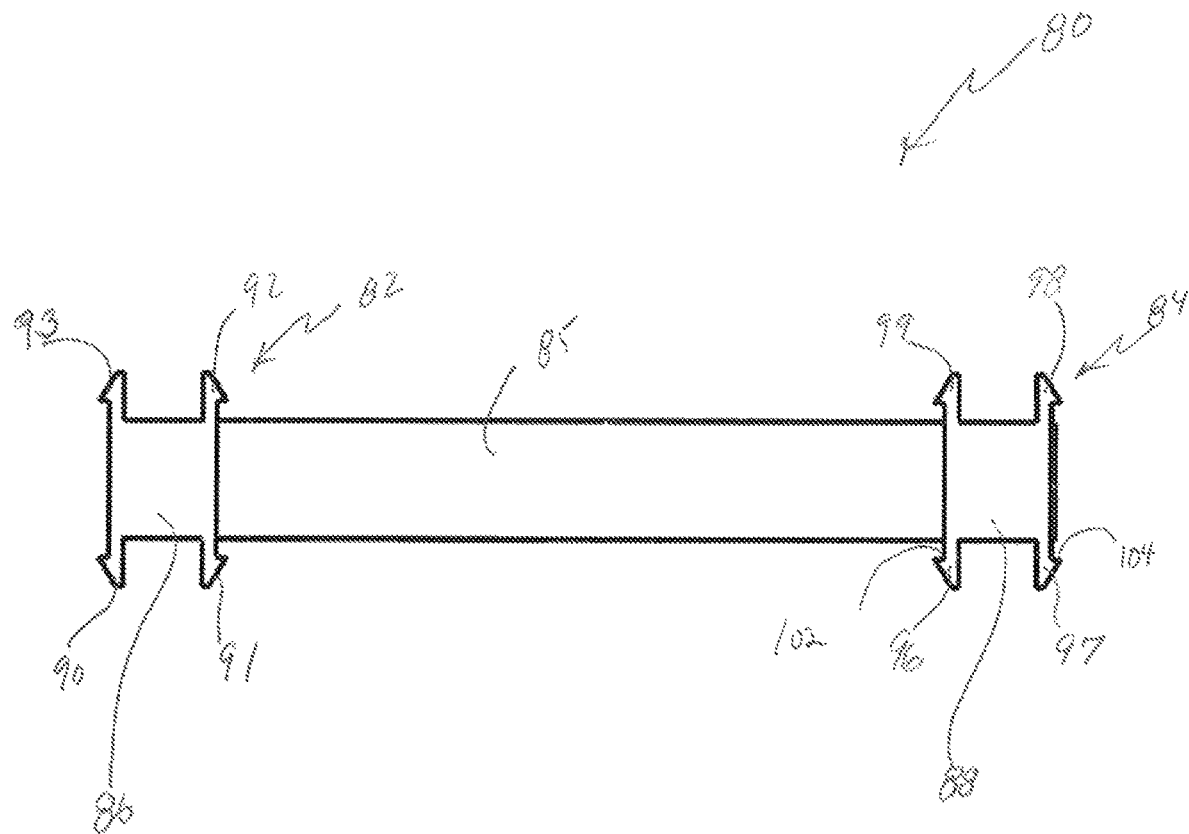
FIG. 4 is a top view of the strap illustrated in FIG. 3.

FIG. 4 is a top view of the strap 80 illustrated in FIG. 3. The first slot nut 86 includes a front pair of flexible tabs 90, 91 and a rear pair of flexible tabs 92, 93. Similarly, the second slot nut 88 includes flexible tabs 96-99. The first and second slot nuts 86, 88 include front and back pairs of flexible tabs to make installation of the strap 80 on the frame 10 (FIGS. 1-2) easier. The flexible tabs include abutment surfaces, such as for example, the flexible tabs 96, 97 that include abutment surfaces 102, 104 respectively, which shall be discussed below.

Figure 5:
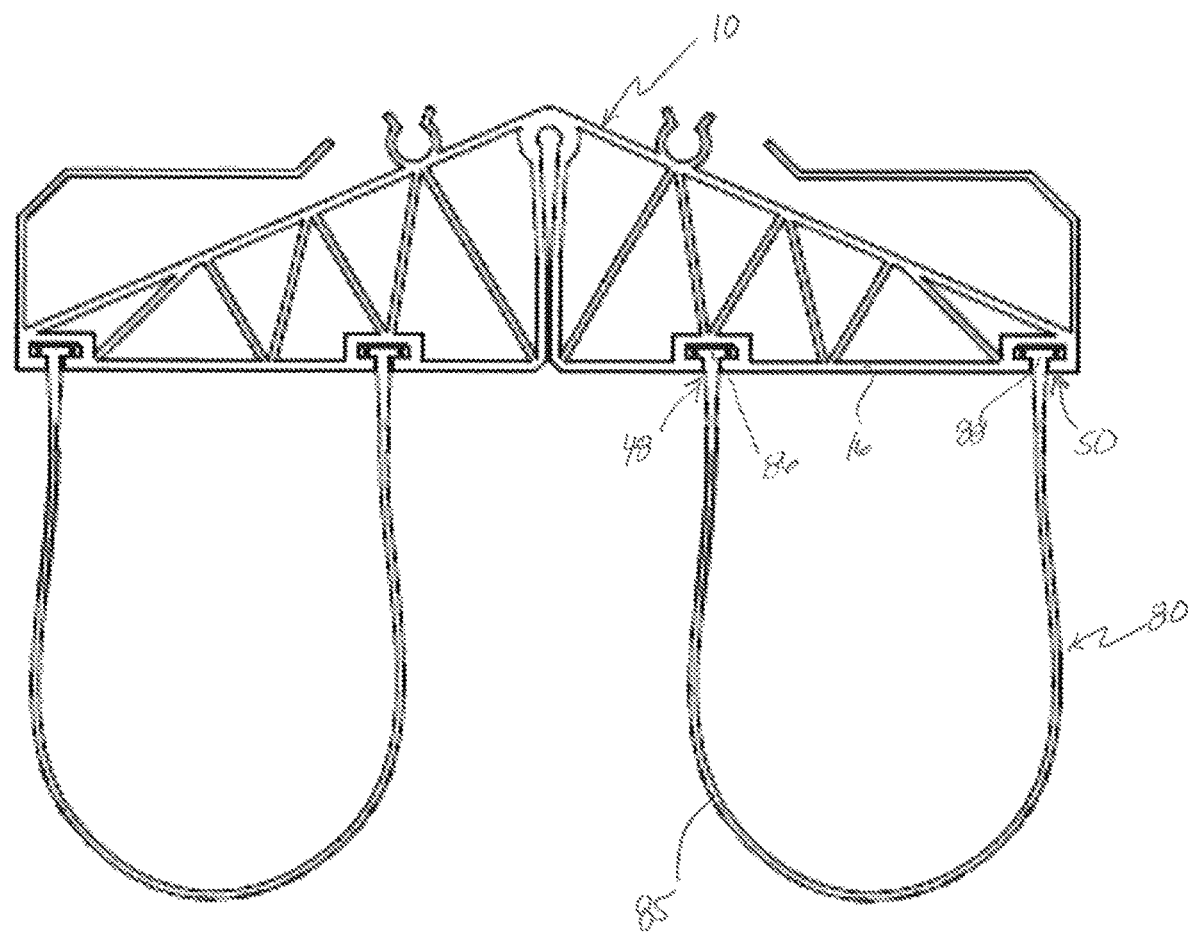
FIG. 5 is a front view of a plurality of straps mounted to the skeletal fame.

FIG. 5 is a front view of a plurality of straps, including the strap 80 (FIG. 4) mounted to the skeletal fame 10. In this embodiment the first slot nut 86 of the strap 80 is inserted into the slot 48 of the frame, and the second slot nut 88 of the strap is inserted into the frame slot 50. Referring to FIGS. 4 and 5, the slot nuts 86, 88 are inserted into their respective slots 48, 50 by pushing the rear pair of flexible tabs 98, 99 (FIG. 4) into and through the slot 50. The nut 88 cannot be pushed entirely through the slot 50 because abutment surfaces 102, 104 (FIG. 4) of the front pair of flexible tabs 96, 97 abut against the second base surface 16 limiting the travel of the tab 88 within the slot 50. See FIG. 4. When the nut 88 is pushed far enough into the slot 50 such that the abutment surfaces 102, 104 (FIG. 4) abut against the second base surface 16, the rear pair of flexible tabs 98, 99 are outside the slot 50 and the rear tabs 98, 99 flex slightly outwardly so the rear tabs cannot pass back through the slot 50 without the rear tabs being pinched inward enough so the rear tabs can enter the slot. Similarly, the tab 88 may be removed by pinching the front tabs 96, 97 inward so the front tabs can enter and pass through the slot 50. This provides a relatively easy and quick way to attach the strap(s) to the frame. The tab 86 may be installed and detached from the frame in a similar manner.

Figure 6:
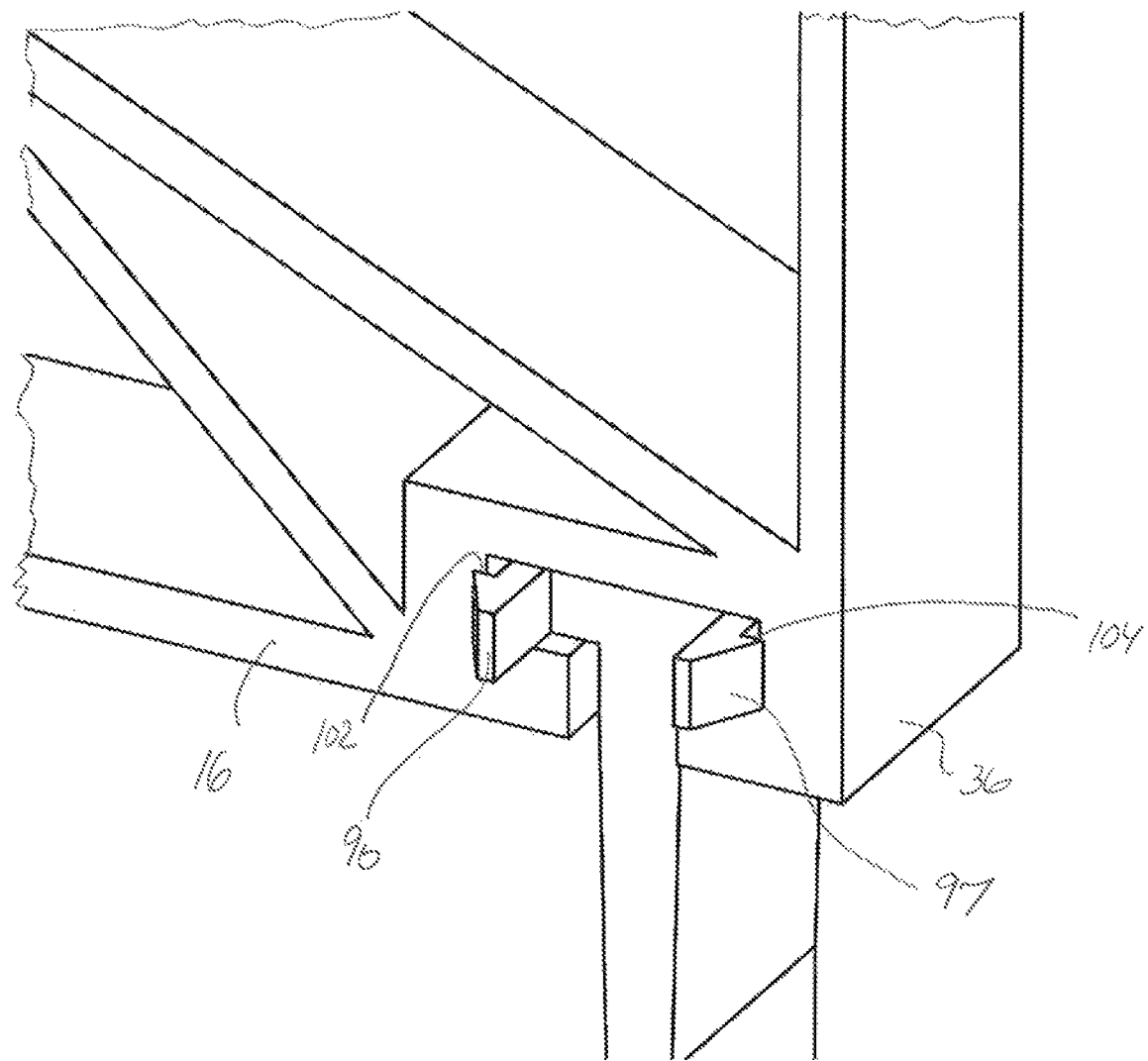
FIG. 6 is a perspective view of front tabs within a hanger slot and the position of the front tabs.

FIG. 6 is a perspective view of front tabs 96, 97 within a hanger slot 50 and the position of the front tabs.

Figure 7:
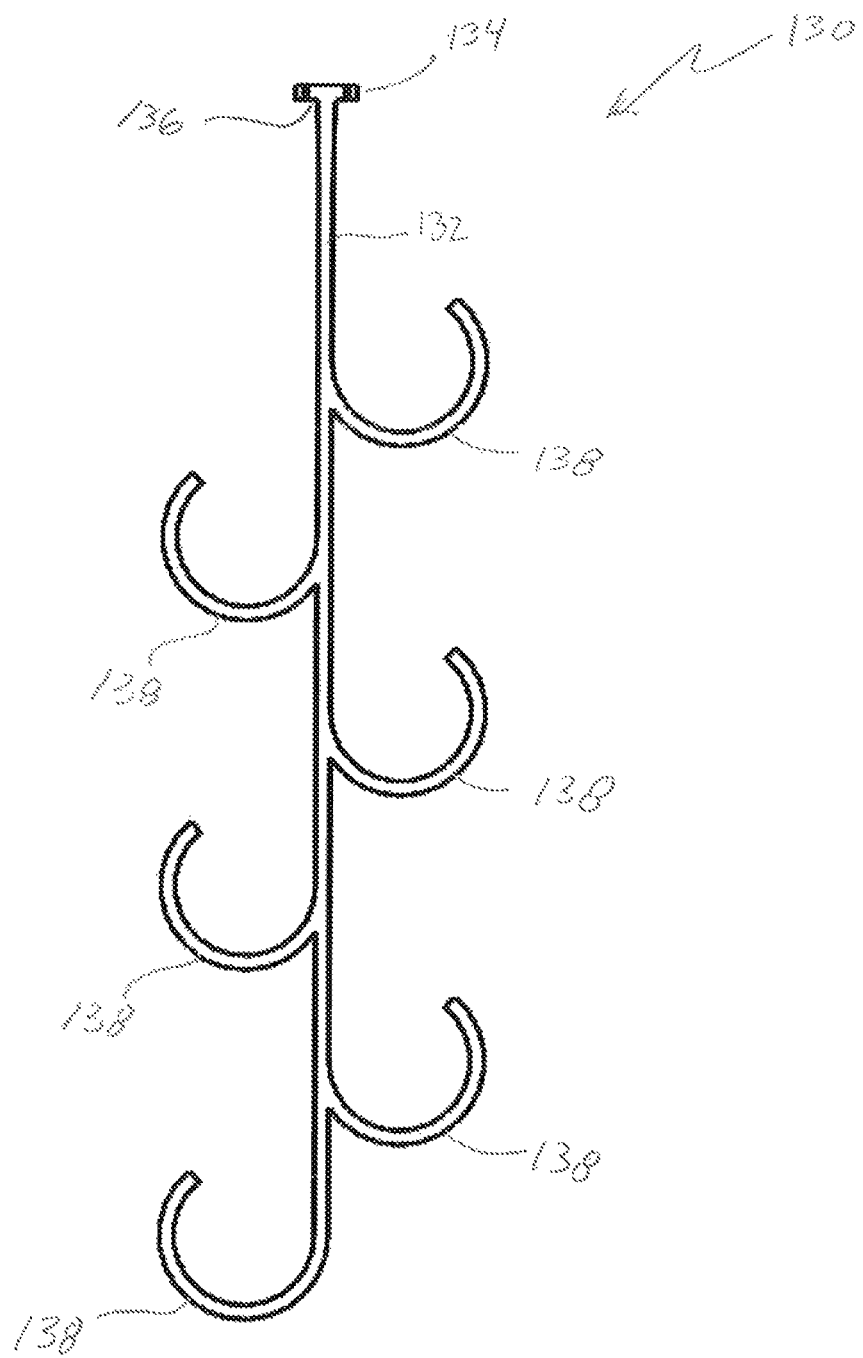
FIG. 7 is a front view of a supplemental hanger that may be hung from the skeletal frame illustrated in FIGS. 1 and 2.

FIG. 7 is a front view of a supplemental hanger 130 that may be hung from the skeletal frame 10 (FIGS. 1 and 2). The supplemental hanger 130 includes a central frame 132 with a slot nut 134 located at a distal shaft end 136 of the central frame 132 and a plurality of cable holding projections 138 extending from the central frame. The cable holding projections 138 may be configured as one or more J-hooks in spaced relationship along the central frame 132. The embodiment of FIG. 7 illustrates a plurality of J-hooks extending from the central frame. Although FIG. 7 illustrates all the cable holding projections 138 as J-hooks of the same size, it is contemplated that the cable holding projections 138 may also be different sizes as well as different shapes.

Figure 8:
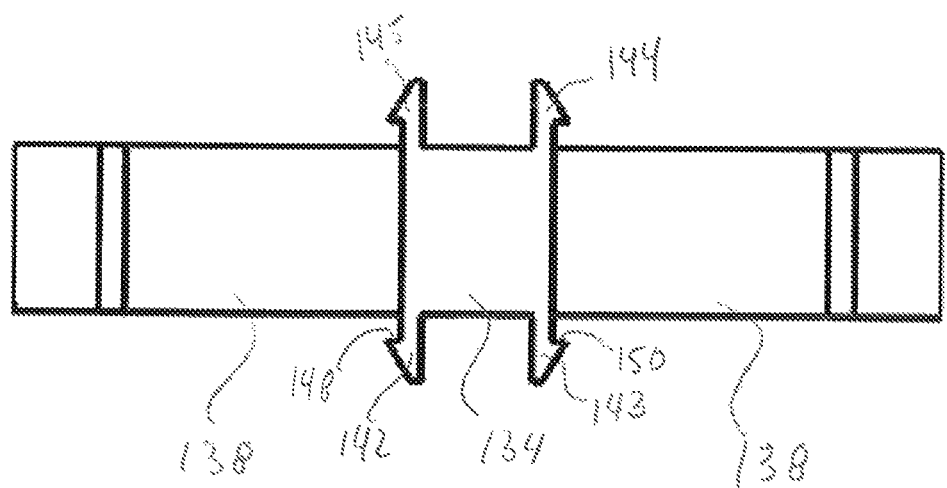
FIG. 8 is a top view of the supplemental hanger illustrated in FIG. 7.
Figure 9:
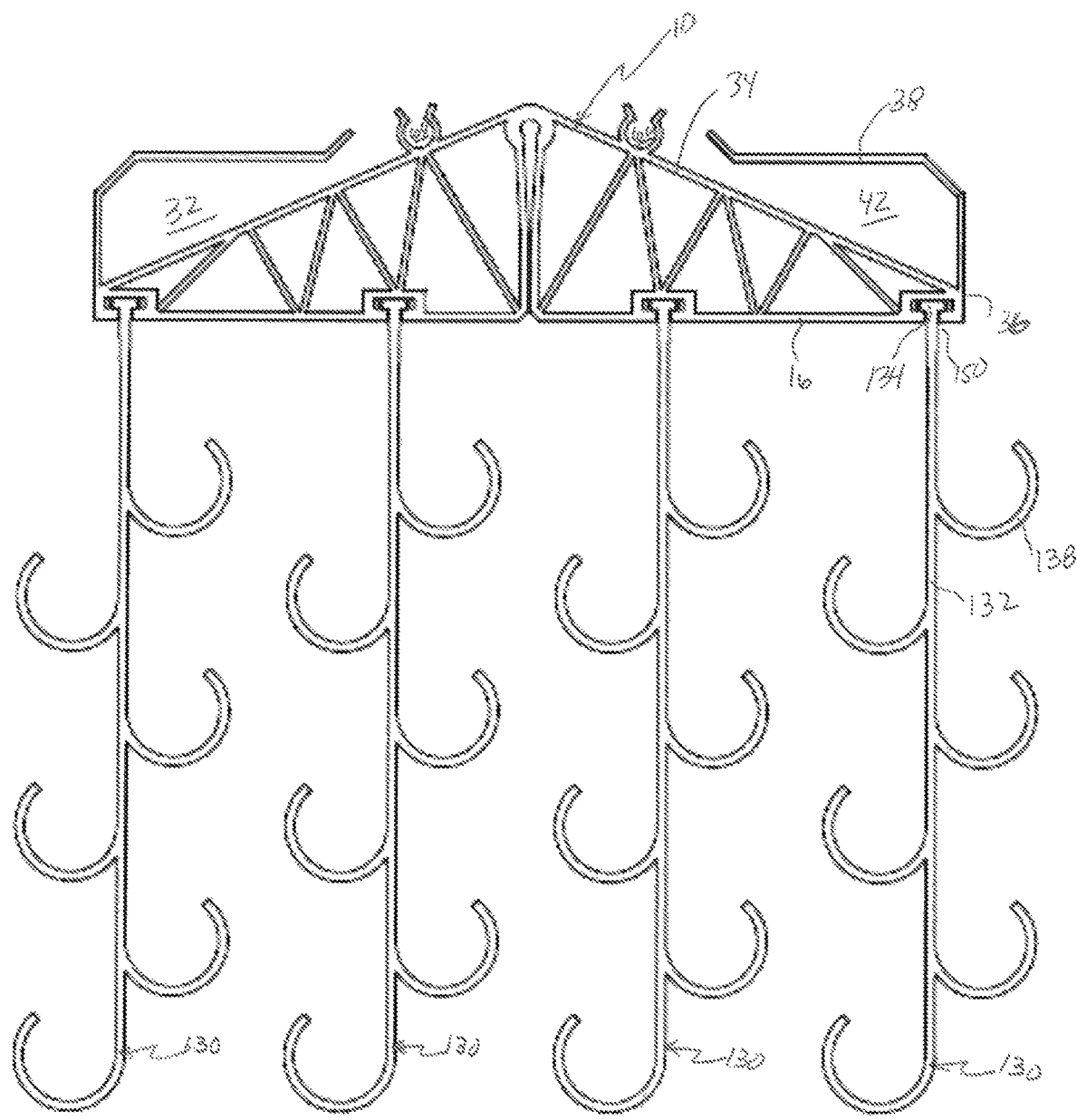
FIG. 9 is a front view of a plurality of supplemental hangers hanging from the skeletal frame illustrated in FIGS. 1 and 2.

FIG. 8 is a top view of the supplemental hanger 130 illustrated in FIG. 7. Similar to the slot nuts 82, 84 of the strap 80 illustrated in FIGS. 3-6, the slot nut 134 of the supplemental hanger 130 includes a front pair of flexible tabs 142, 143 and a rear pair of flexible tabs 144, 145. It is contemplated that the cable holding projections can be one or more of a number of different shapes suitable for supporting cables, including cables of different sizes. The FIG. 9 is a front view of a plurality of supplemental hangers, including the supplemental hanger 130 (FIG. 7) mounted to the skeletal fame 10. In this embodiment the slot nut 134 of the supplemental hanger 130 is inserted into the slot 50 of the frame 10. The slot nut 134 is inserted into the slot 50 by pushing the rear pair of flexible tabs 144, 145 (FIG. 8) into and through the slot 50. The nut 134 cannot be pushed entirely through the slot 50 because abutment surfaces 148, 150 (FIG. 8) of the front pair of flexible tabs 142, 143 abut against the second base surface 16 limiting the travel of the tab 134 within the slot 50. When the nut is pushed far enough into the slot such that the abutment surfaces 148, 150 of the flexible tabs 142, 143 abut against the second base surface 16, the rear flexible tabs 144, 145 are outside slot 50 and the rear tabs flex slightly outwardly. This prevents the rear tabs 144, 145 from passing pass back through the slot 50 without the rear tabs 144, 145 being pinched inward enough so the rear tabs can enter the slot. Similarly, the tab 134 may be removed by pinching the front tabs 142, 143 inward so the front tabs can enter and pass through the slot 50. This provides relatively easy and quick way to attached the supplemental hanger(s) to the frame.

The scalable hanger arrangement disclosed herein allows for various configurations. For example, for some solar panel tracker systems the skeletal frame 10 alone may be sufficient, but in larger solar panel tracker system embodiments such as FIG. 5 or 9 may be required to handle all the cables. The skeletal frame 10 may be larger than the embodiment illustrated to FIGS. 1-2 to handle more cable, and/or to allow for more secondary hanger components such as for example the strap 80 (FIGS. 3-5) or the supplemental hanger 130 (FIG. 7). It is contemplated that the hanger may have more than two finger projections to establish additional cable receptacle area, or no fingers at all. Similarly for the furcated members, there can zero, one, two or more furcated members on the hanger.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A cable hanger assembly, comprising:
 a unitary skeletal frame comprising:
  a base that comprises a first base surface and a second base surface that are separated by a channel that is open at a proximate channel end and closed at a distal channel end;
  a first sidewall extending from a distal end of the first base surface to the distal channel end;
  a second sidewall extending from a distal end of the second base surface to the distal channel end; and
  where at least one of the first and second base surfaces includes a slot open on its respective proximate slot end,
  where the first sidewall includes a finger projection extending in the direction of the distal channel end, where the finger projection includes a finger distal end that is separated from the first sidewall and forms a cable receptacle area with the first sidewall.

2. The cable hanger assembly of claim 1, where the second sidewall includes a second finger projection extending in the direction of the distal channel end, where the second finger projection includes a second finger distal end that is separated from the second sidewall and forms a second cable receptacle area with the second sidewall.

3. The cable hanger assembly of claim 1, where at least one of the first and second sidewalls includes an outwardly facing furcated member.

4. The cable hanger assembly of claim 1, where the unitary skeletal frame comprises polypropylene.

5. The cable hanger assembly of claim 1, where the unitary skeletal frame comprises polypropylene with an ultraviolet additive.

6. The cable hanger assembly of claim 1, where the unitary skeletal frame comprises plastic.

7. The cable hanger assembly of claim 1, where the unitary skeletal frame comprises metal.

8. The cable hanger assembly of claim 1, where the slot is a T-slot.

9. The cable hanger assembly of claim 1, further comprising a unitary supplemental hanger assembly that comprises:
 a shaft;
 a slot nut located at a distal shaft end of the shaft; and
 a plurality of cable holding projections extending from the shaft.

10. The cable hanger assembly of claim 9, where the cable holding projections include a J-hook.

11. The cable hanger assembly of claim 9, where the cable holding projections include a plurality of J-hooks in spaced relationship.

12. The cable hanger assembly of claim 1, where the unitary skeletal frame further comprises:
 a second slot located in one of the first or second base surfaces; and
 a strap having a first longitudinal end and a second longitudinal end, where the first longitudinal end includes a first slot nut that engages with the first slot and the second longitudinal end includes a second slot nut that engages with the second slot, such that the strap forms a cable carrying receptacle suspended from the unitary skeletal frame.

13. The cable hanger assembly of claim 12, where the strap comprises polypropylene.

14. The cable hanger assembly of claim 12, where the strap comprises polypropylene with an ultraviolet additive.

15. The cable hanger assembly of claim 12, where the strap comprises plastic.

16. The cable hanger assembly of claim 12, where the strap comprises metal.

17. The cable hanger assembly of claim 1, where the hanger is configured and arranged as a truss structure comprising a plurality of webs.

18. The cable hanger assembly of claim 1, a removable and replaceable supplemental hanger assembly that is engaged with the slot and suspended from the slot.

* * * * *